Patented June 27, 1950

2,512,671

UNITED STATES PATENT OFFICE 2,512,671

HEMI-FORMALIZATION PRODUCTS OF UREA-FORMALDEHYDE RESINOUS CONDENSATES

Emil E. Novotny, Prospectville, George Karl Vogelsang, La Mott, and Ernest E. Novotny, Philadelphia, Pa., assignors to The Borden Company, New York, N. Y., a corporation of New Jersey No Drawing. Application August 8, 1945, Serial No. 609,716

5 Claims. (Cl. 260—69)

The present invention concerns itself with improvements relating to urea-formaldehyde resinous condensation products. More specifically stated the present invention concerns itself with new and novel products produced by reacting concentrated urea-formaldehyde resinous condensate with formaldehyde. The distinctive products thus produced appear to be "hemi-formals" of urea-formaldehyde resinous condensates.

Heretofore it has been assumed that not more than two molecules of formaldehyde could enter into combination with one molecule of urea to form a urea-formaldehyde resinous condensate. We have made the discovery that when formaldehyde of suitable strength is added to appropriate urea-formaldehyde resinous condensates, under suitable conditions, reaction occurs, leading to the formation of new and distinctive products. The products thus formed appear to be in the nature of hemi-acetals. We have made the further discovery that by subjecting the above reaction products to an additional treatment it is possible to achieve a further reaction, leading to the production of what appear to be true acetals.

Aqueous preparations of urea-formaldehyde resinous condensates are in the nature of disperse systems of hydrophilic colloids. The resinous condensate has associated with it substantial quantities of water of combination. We find that just as urea-formaldehyde resinous condensates affix to themselves, in a state of more or less loose association, molecules of water so, in a parallel manner, can they affix to themselves molecules of formaldehyde. Formaldehyde thusly bound to a urea-formaldehyde resinous condensate appears to be fixed by means of a hemi-acetal linkage. We have further found that aqueous concentrated solutions of formaldehyde exert a powerful solvent effect upon the urea-formaldehyde resinous condensate, as well as the hemi-formal thereof. In many instances the solvent effects of the formaldehyde are sufficiently great so as to permit its use as a coupling agent between the urea-formaldehyde resinous condensate and products with which such compositions are normally incompatible, including water in the instance of the limited water-soluble type.

Studies carried out by us indicate that the products of the present invention constitute complex systems whose various components are in a state of dynamic equilibrium with one another. In such a system the water exists (1) more or less firmly bound to the urea-formaldehyde resinous condensate; (2) bound to formaldehyde (e. g., methylene glycol, etc.); (3) as free water. In these systems the formaldehyde exists (1) more or less firmly bound to the urea-formaldehyde resinous condensate, probably in the form of the hemi-acetal and (2) in combination with water (e. g., methylene glycol, etc.). There is also present the triple addition products comprising urea-formaldehyde resinous condensate in combination with water and formaldehyde.

The products of the present invention contain water, formaldehyde, reaction products between formaldehyde and water such as methylene glycol, hydrated urea-formaldehyde resinous condensates, the reaction products of urea-formaldehyde resinous condensates with formaldehyde, as well as the triple addition products comprising urea-formaldehyde resinous condensates with water and formaldehyde. These components are engaged in a variety of reversible reactions, leading to a state of dynamic equilibrium. The addition or removal of any of the components present in the system has the effect of shifting the equilibrium in accordance with the laws of mass action.

In order that the unique and distinctive attributes of the products of the present invention may manifest themselves in a degree adequate to permit one to capitalize upon them, it is evident that the various components that enter into the complex composition of the present invention must be present within certain predetermined concentrations. When the concentration of any one of the components entering into the system falls too far outside of the predetermined preferred range, then the new and distinctive features of the products of the present invention do not manifest themselves to a degree that is adequate to permit one to capitalize upon them for purposes of specific applications.

The hemi-formalization products of the present invention are produced by adding predetermined quantities of formaldehyde in concentrated form to concentrated urea-formaldehyde resinous condensates of appropriate composition. There are at least five conditions or features that are essential to the successful prosecution of the present invention.

Three of these conditions have to do with the concentrated urea-formaldehyde resinous condensates, i. e., the resinous condensates prior to their "hemi-formalization." The other two conditions concern themselves with the "hemi-formalization." The criteria and detail that surround these conditions are presented below.

*Condition 1.*—For the production of the concentrated urea-formaldehyde resinous condensate (i. e., before the "formalization") there should be used substantially two moles of formaldehyde per mole of urea. The use of less than 1.5 moles of formaldehyde per mole of urea is not recommended because under such circumstances it is difficult to procure a satisfactory resinous condensate. On the other hand, the use of more than 2.5 moles of formaldehyde per mole of urea is equally undesirable, as it leads to a variety of difficulties. When excessive quantities of formaldehyde are used, in the form of the usual aqueous solutions, one ends up, after resinification, with a very dilute solution of condensate which must be concentrated to within predetermined limits, thus necessitating the distilling off of large quantities of water. Without recourse to the use of very special equipment it is not feasible to remove this water without at the same time removing the bulk of the excess formaldehyde. The formaldehyde concentration of the distillate thus procured is usually too low to permit of satisfactory utilization—the concentration of such dilute aqueous formaldehyde solutions is a costly operation whereas to discard the distillate represents an even greater economic loss. When the ratio of formaldehyde to urea exceeds substantially 2.5 moles per mole of urea, then the length of time required to produce the resinous condensate is unduly increased, a circumstance which decreases the output per unit of equipment.

In the production of concentrated urea-formaldehyde resinous condensates for the purposes of the present invention we recommend the use of between 1.75 and 2.5 moles of formaldehyde per mole of urea. The most satisfactory results appear to be secured when one utilizes two moles of formaldehyde per mole of urea.

In carrying out the reaction between formaldehyde and urea it is necessary that a certain amount of water be present. For reasons for economy it is customary to carry out this reaction through the use of aqueous formaldehyde solutions, e. g., those containing between 20 and 40 percent of formaldehyde are eminently satisfactory. Formaldehyde in more concentrated states, as for example in the so-called formaldehyde sludges, is equally satisfactory. We have found the usual commercial Formalin solution, containing about 37% formaldehyde, to be highly satisfactory. When the formaldehyde solution used has a concentration of less than 20% of formaldehyde it leads to an inefficient utilization of the formaldehyde and at the same time necessitates the distilling off of undesirably large quantities of water. When the formaldehyde content is in excess of 40% greater difficulties are encountered in carrying out the reaction, owing to excessive reaction velocities, i. e., a smoother and more easily controlled reaction is secured when the formaldehyde content is between 20 and 40%.

*Condition 2.*—For the purposes of the present invention the urea-formaldehyde resinous condensate must be concentrated to a point where the concentrate weighs between 2 and 2.5 parts per part of urea utilized in the reaction. The preferred weight of concentrate is in the neighborhood of 2.2 times the weight of urea utilized. To concentrate the product to below the minimum weight indicated represents needless expense and entails unnecessary difficulties. If the condensate be not concentrated down to the maximum indicated weight, then the subsequent "formalization" is interfered with.

*Condition 3.*—For the purposes of the present invention it is necessary that substantially the whole of the urea-formaldehyde condensate be "resinified." It is insufficient to carry out the condensation merely to the dimethylol urea stage. This end is best attained by first reacting the formaldehyde with the urea under conditions of controlled alkalinity, leading to the production of dimethylol urea. The dimethylol urea may then be conveniently converted over into a substantially wholly resinous condensate by subjecting it to further reaction in an acidic environment. By dividing the condensation of the formaldehyde with the urea into two stages, after the afore-described manner, it is found that a smoother control of the operation is secured together with a greater degree of uniformity from run to run. If the resinification has been properly carried out the resin is all in the dissolved stage, leading to the production of a water clear syrup. A small amount of cloudiness or opaqueness is not detrimental.

Concentrated urea-formaldehyde condensates which are produced in processes which conform to the afore-described three conditions consist almost wholly of urea-formaldehyde condensates in resinous form, and contain substantially no free urea or dimethylol urea.

*Condition 4.*—This condition concerns itself with the concentration of the formaldehyde that has to be added to the afore-described concentrated urea-formaldehyde resinous condensates to effect their "hemi-formalization." To be effective the formaldehyde of formalization must be in a concentrated state. One may utilize formaldehyde of 100% concentration, e. g., gaseous formaldehyde, or paraformaldehyde. For most applications, however, it is satisfactory and more economical to utilize aqueous formaldehyde solutions. The formaldehyde concentration of such solutions should be at least 25% inasmuch as the water sets a limit to the degree of formalization that is procurable. Commercial Formalin solutions containing about 37% of formaldehyde or the more concentrated formaldehyde sludges which may contain anywhere between 40 and 80% of formaldehyde are admirably suited. The less the quantity of water that is introduced along with the formaldehyde the higher the degree of formalization. On the other hand, the use of no water or too little water my result in compositions that are too viscous or possessed of too short a liquid life for some applications. Hence the maximum quantity of water that is tolerable will depend upon the ultimate use to which the product is put.

*Condition 5.*—This condition concerns itself with the quantity of formaldehyde that has to be added to achieve the formalization. In order that the distinctive attributes that are associated with the phenomenon of formalization manifest themselves to a substantial degree it is necessary that at least 0.5 mole of formaldehyde of formalization be added per mole of urea that entered into the making of the concentrated urea-formaldehyde resinous condensate. For most applications the optimum degree of formalization is achieved when one utilizes 1 mole of formaldehyde of formalization per mole of urea. Although there does not appear to be any theoretical limit as to the quantity of formaldehyde that may be utilized for purposes of formalization, it is noted that in practice it is undesirable to utilize more than 1.5 moles of formaldehyde per mole of urea owing to the difficulties encountered in effectively utilizing such excessive quantities of formaldehyde. In determining the amount of formaldehyde of formalization that is to be added to the resinous condensate, cognizance must be taken of any free formaldehyde that may be present in the concentrated urea-formaldehyde resinous condensate. When 1.75 moles of formaldehyde are reacted with a mole of urea to form the concentrated urea-formaldehyde resinous condensate, it will be found that the condensate contains only negligible quantities of free formaldehyde. When two moles of formaldehyde are utilized per mole of urea in the production of the urea-formaldehyde resinous condensate, it is found that after concentration, only a small quantity of free formaldehyde is present. On the other hand, when 2.5 moles of formaldehyde are utilized for reaction with the urea, it is found that, after concentration, between 0.4 and 0.6 mole of free formaldehyde remain, which may be looked upon as available for formalization.

We wish to point out that the formaldehyde of formalization should not be confused with any excess formaldehyde that may have been employed in carrying out the original reaction between the urea and the formaldehyde inasmuch as, after concentration, the urea-formaldehyde resinous condensate will contain but little of the original excess formaldehyde, because all, or most of it, will have been removed in the process of distilling off the water.

It will be observed that there is a reasonable degree of leeway as regards the precise quantities of the various agents utilized in producing the hemi-formalization products of the present invention. At the same time it will be observed that, when considered collectively, the successful prosecution of the present invention hinges upon the simultaneous fulfillment of a number of predetermined conditions.

We wish it to be distinctly understood that although we have described a specific method for the preparation of concentrated formaldehyde-urea resinous condensates, one may utilize any of the methods known to the art for the preparation of similar condensates. Furthermore, in lieu of formaldehyde and urea one may utilize monomethylol urea and dimethylol urea for the production of the concentrated urea-formaldehyde resinous condensate. The above generalized description, as well as the subsequent specific description, for the preparation of concentrated urea-formaldehyde resinous condensates is presented only in the interest of clarity and for the purpose of exemplifying a preferred type of resinous condensate that is preeminently adapted to the preparation of the hemi-formalization products of the present invention.

We present below the detailed description of the preparation of an infinitely water-soluble type of concentrated urea-formaldehyde resinous condensate which is preeminently adapted to hemi-formalization as per the present invention. The process as outlined has been found to yield excellent results in (1) laboratory glassware, (2) pilot plant equipment, (3) large scale commercial operation, (4) operation via a continuous system as in pipes or a plurality of kettles connected in series. The process is one which has been found to yield unfailingly uniform and consistent products, both as to yield and quality.

*Example 1A.*—A commercial aqueous solution of formaldehyde (containing approximately 37% of formaldehyde) is preneutralized to a pH of between 7.0 and 7.5 via the addition of aqueous sodium hydroxide solution. After standing about 24 hours (or for shorter periods if elevated temperatures are employed) the formaldehyde solution is reneutralized to a pH of about 7.0. Charge into the reaction kettle 165 pounds of the above neutralized formaldehyde solution (2 moles), 60 pounds of urea (1 mole) along with 800 mil of catalyst No. 24364 and 320 mil of catalyst No. 24365. The catalyst imparts to the medium a controlled and buffered alkalinity. Stir the mixture and rapidly heat it to a temperature of between 205 and 212° F. The mixture is kept within this temperature range for a period of 4 minutes (at this point of the processing the reaction mixture consists essentially of a solution of dimethylol urea), at which time there is added 1600 mil of catalyst No. 24366. A vigorous exothermic reaction ensues, usually causing the mixture to boil and reflux if the reaction is carried out at atmospheric pressure (at appropriate super-atmospheric pressure the ebulition is suppressed). Six minutes later the reaction is brought to a halt by neutralizing the acidity and rendering the mass appropriately alkaline via the addition of 1600 mil of catalyst No. 24367. In this manner there is produced a dilute aqueous solution of a urea-formaldehyde resinous condensate which is ready for concentration. This solution contains only negligible quantities of unreacted urea or dimethylol urea.

The numbered catalysts and reagent solutions referred to in the above description are prepared as follows:

*Catalyst No. 24364.*—Into a one liter volumetric flask place 400 mil of a normal sodium hydroxide solution and 100 grams of boric acid. Then add sufficient water to make the volume up to one liter.

*Catalyst No. 24365.*—This is a dilute sodium hydroxide solution with a normality of 1.265.

*Catalyst No. 24366.*—Into a one liter volumetric flask place 30 grams of citric acid, USP; 48.1 mil of a 4 normal solution of sodium hydroxide; 54.7 mil of a 12.08 normal solution of hydrochloric acid; a quantity of water sufficient to make the volume up to one liter.

*Catalyst No. 24367.*—This represents a sodium hydroxide solution with a normality of 1.320.

The concentration of the above solution is best carried out by evaporation under reduced pressure. The use of a 20 to 28 inch vacuum has proven very satisfactory. It is desirable to regulate the rate of heating so that a rapid rate of distillation is maintained. The vacuum concentration may be stopped at any desirable point. For the purposes of the present invention it is desirable to remove the bulk of the water so as to secure a highly concentrated solution of urea-formaldehyde resinous condensate. It is recommended the dilute solution of urea-formaldehyde resinous condensate be concentrated to a weight of 132 pounds, i. e., 2.2 times the weight of the urea entering into the initial charge. The product thus produced constitutes what is hereinafter referred to as a "concentrated urea-formaldehyde resinous condensate."

It will be noted that we, in the above description, have set forth methods for the preparation of solutions of dimethylol urea, dilute aqueous solutions of urea-formaldehyde resinous condensate, and concentrated urea-formaldehyde resinous condensates.

For many applications it is desirable to buffer and stabilize the above concentrated urea-formaldehyde resinous condensate by adding thereto an appropriate buffer, e. g., the addition of a weak acid (such as boric acid) and the subsequent adjustment of the pH to between 8 and 9 via the addition of e. g., sodium hydroxide solution.

The concentrated urea-formaldehyde resinous condensate prepared as per the above directions is water clear and infinitely soluble in water. By prolonging the period of time during which the reacting mixture is in an acidic environment it is possible to produce products possessed of but a limited solubility in water. Generally, for the purposes of the present invention, it is advantageous to utilize the infinitely water soluble type of product inasmuch as it permits of greater leeway as regards the diversity of application and, as will be indicated later, it is possible to convert these water soluble types, after hemi-formalization, over into products of limited solubility.

We wish to emphasize that we do not, in the present application, lay claim to any method for the manufacture of formaldehyde, urea, dimethylol urea, or concentrated urea-formaldehyde resinous concentrates. The above detailed description for the production of a concentrated urea-formaldehyde resinous condensate is presented only in the interests of clarity and for the purpose of illustrating a type of resinous condensate that readily lends itself to hemi-formalization.

The hemi-formalization of the concentrated urea-formaldehyde resinous condensate is accomplished by adding thereto formaldehyde in any one of its various forms, provided that it is of adequate concentration. One may employ formaldehyde in the gaseous state, pure liquid formaldehyde, formaldehyde in the solid form (e. g. paraformaldehyde), or concentrated aqueous solutions of formaldehyde (aqueous solution with a formaldehyde content of not less than 25%). The two forms of formaldehyde most conveniently utilized in the pursuit of the present invention are aqueous formaldehyde solutions with a formaldehyde content of 37% and paraformaldehyde. Whether a 37% aqueous formaldehyde solution or paraformaldehyde is to be used for purposes of formalization should be predicated upon the ultimate application to which the product is put. The primary consideration in determining which form of formaldehyde is to be used depends upon the quantity of water that can be tolerated in the final composition.

For purposes of hemi-formalization one adds to the above described concentrated urea-formaldehyde resinous condensate between 0.5 and 1.5 moles of formaldehyde per mole of urea that went into the making of the said resinous concentrate. In the event that the concentrated urea-formaldehyde resinous condensate already contains a substantial quantity of formaldehyde over and above the 2 moles of formaldehyde per mole of urea (a condition which may result from the use of large quantities of formaldehyde in the carrying out of the initial reaction) then a proportionately smaller quantity of formaldehyde is added. For most applications we find that the "optimum" degree of formalization is achieved when the formaldehyde of formalization amounts to about one mole per mole of urea. It will be noted that when one adds one mole of formaldehyde of formalization to the preferred two moles of formaldehyde used in producing the resinous condensate, we have a total of 3 moles of formaldehyde per mole of urea entering into the hemi-formalized composition.

We present below numerous examples depicting the production of the hemi-formalization products of the present invention.

*Example 2A.*—To 132 pounds of urea-formaldehyde resinous condensate (as per Example 1A) there are added 81 pounds of a 37% aqueous formaldehyde solution (methanol free). The materials are thoroughly mixed together.

*Example 2B.*—To 132 pounds of concentrated urea-formaldehyde resinous condensate (as per Example 1A) there are added 86 pounds of a 37% aqueous formaldehyde solution (containing methanol). The materials are thoroughly mixed together.

*Example 2C.*—To 132 pounds of concentrated urea-formaldehyde resinous condensate (as per Example 1A) there are added 30 pounds of paraformaldehyde. The ingredients are thoroughly mixed together. It is advantageous in this instance to carry out the mixing at somewhat elevated temperatures so as to expedite the solution of the paraformaldehyde. This hemi-formalization product is much more concentrated than that of the two previous examples. The specific gravity and specific viscosity are proportionately higher. Owing to the comparatively small water content of this type of product, it is preeminently suited for use in applications where substantial water concentrations are harmful or undesirable, as for example, for mixture with a wide variety of organic compounds.

*Example 2D.*—To 132 pounds of concentrated urea-formaldehyde resinous condensate (as per Example 1A) there are slowly added 30 pounds of gaseous formaldehyde. The rate of absorption of formaldehyde by the concentrated urea-formaldehyde resinous condensate is rather slow, so that it is necessary to employ vigorous agitation. The reaction is best carried out at somewhat elevated temperatures. However, a considerable amount of heat is evolved as a result of the interaction of the gaseous formaldehyde with the concentrated urea-formaldehyde resinous condensate making it necessary to provide suitable means for controlling the temperature.

*Example 2E.*—To 132 pounds of concentrated urea-formaldehyde resinous condensate (as per Example 1A) there are added 50 pounds of formaldehyde sludge (formaldehyde content 60%). The materials are thoroughly mixed together. It is advantageous to carry out the mixing at slightly elevated temperatures so as to secure a rapid dispersal and solution of the formaldehyde. The hemi-formalization product of this example is intermediate between that of Examples 2A and 2C.

If it is desired to secure the maximum shelf life out of the above hemi-formalization products it is recommended that they be stabilized via the addition of appropriate buffers, e. g. sodium borate solution adjusted so as to bring the pH of the final composition to between 8.0 and 9.0. For most applications it is unnecessary to stabilize and buffer the hemi-formalization product because, unlike the usual types of urea-formaldehyde resinous condensate, these products are possessed and endowed with new and unique attributes which result in a marked increase in shelf life and preclude the setting up of the material to the final "C" stage, as is ordinarily the case.

We have discovered that in lieu of employing concentrated urea-formaldehyde resinous condensates of the type illustrated in Example 1A, we may also use what may be referred to as "modified" concentrated urea-formaldehyde resinous condensates for the preparation of the hemi-formalization products of the present invention. The "modified" resinous condensates are produced by replacing a minor portion of the urea or the formaldehyde with other reactive compounds. It is to be noted, however, that for the production of the products of the present invention, urea and formaldehyde appear to be essential ingredients.

We shall consider first the partial replacement of the urea. The modifying agent should be of the type that is capable of entering into reaction with formaldehyde. The molar proportions of the modifying agent employed should under no circumstances be greater than the molar proportion of urea. The majority of "modifying agents" for this purpose belong to the class of organic compounds and are of a character such that they can, per se, react with formaldehyde. Materials that are usable for the purpose of modifying urea-formaldehyde resinous condensates are depicted in the following list: ammonium thiocyanate; urethanes; alkylidene urethanes and diurethanes; carbamic acid derivative of aminocarboxylic acid and peptides; alkyl urea; ureides; ureides of hydroxy acid; dicarbamic ester and related compounds; derivatives of imidocarbonic acid; hydrazine-, azine-, and azido-derivatives of carbonic acid; sulphur containing derivatives of carbamic acid and of urea; guanidine and its immediate derivatives; e. g. guanidine salts, alkyl-guanidines, guaneides of the hydroxy acids, creatine, creatinine, guaneides of carbonic acid, guanoline, guanyl urea, guanyl guanidine, cyano-guanidine, guanyl thiourea, nitro, amino and hydroxy guanidine and their transposition products, nitriles and imides of carbonic and thiocarbonic acid; oxygen derivatives of cyanogen, their isomerides and polymerides e. g. isocyanic acid, cyanuric acid and its alkylic derivatives; halogen derivatives of cyanogen and its polymers; sulphur compounds of cyanogen, their isomers and polymers, e. g. thiocyanate, cyanogen sulphide, alkylthiocyanate; thiocyanic compounds derived from aldehyde glycols, hydroxy-ketones and hydroxy acids, e. g., thiocyanacetone; cyanamide, monoalkylcyanamides; amides of cyanuric acid and imides of isocyanuric acid such as the various triazines, e. g. 2,4,6-triamino-1,3,5-triazine; as well as ammelide, ammeline, thioammeline; the guanamines, e. g. formoguanamine, acetoguanamine; tetra-azines etc. Other compounds that are useful for purposes of modification are the amino alcohols, hydroxy-amino compounds, carbohydrates (including the soluble derivatives of starches) mono- and polyhydric phenols, water-soluble phenolformaldehyde reaction products; acetals of monohydric and polyhydric alcohols such as formal ethylene glycol, formal glycerol, furfurglycerol, butyl acetal and in general the acetals of the lower and intermediate alcohols; ketonealdehyde condensation products of the water soluble type; water-soluble protein materials; various water-soluble resins.

An alternative procedure to achieve the modification of the concentrated urea-formaldehyde resinous condensate that is to be subjected to the formalization of the present invention resides in replacing a portion of the formaldehyde with other aldehydes. We have found that the bulk of the aldehyde utilized for reaction with the urea should be formaldehyde and that the other aldehyde should be used in only limited quantities. Although no particular theoretical limitation is envisaged as regards the nature of the aldehyde that may be used for the replacement of a portion of the formaldehyde for the production of the concentrated urea-formaldehyde resinous condensate for use in the present invention, it is noted that there are but a limited number of aldehydes that are useful. Among such aldehydes may be mentioned acetaldehyde, propionaldehyde, normal butyl aldehyde, and isobutyl aldehyde. When utilizing acetaldehyde or propionaldehyde it is desirable to carry out the reaction under pressure owing to the volatility of these aldehydes. Butyl aldehyde reacts very slowly. Dialdehyde such as glyoxal may be utilized in this reaction, as may also various nitro aldehydes.

Various other modifications are possible by utilizing combinations of modifying agents or by mixing together concentrated urea-formaldehyde resinous condensates of dissimilar composition.

It is to be noted that all of the recommended "modifying agents" are of the type which contains one or more reactive hydrogen groups.

We present below a few examples illustrative of the use of "modifying agents."

*Example 1B.*—This example is in all respects identical with Example 1A except that in lieu of 60 pounds of urea there is substituted a mixture comprising 40 pounds of urea and 14 pounds of 2,4,6-triamino-1,3,5-triazine. After concentration the modified urea-formaldehyde resinous condensate may be formalized after the manner depicted in Examples 2A to 2E inclusive.

*Example 1C.*—This example is in all respects identical with Example 1A except that the 60 pounds of urea are replaced by a mixture comprising 48 pounds of urea and 14.8 pounds of formoguanamine (2,4 - diamino-1,3,5-triazine). After concentration the urea-formoguanamine formaldehyde resinous condensate may be formalized after the manner depicted in Examples 2A to 2E inclusive. Various other guanamines may be used in place of the formoguanamine.

*Example 1D.*—This example is in all respects identical with Example 1A except that in lieu of 60 pounds of urea there is used a mixture comprising 40 pounds of urea and 36 pounds of ammeline (6-oxy-2,4-diamino-1,3,5-triazine).

After concentration the modified urea-formaldehyde resinous condensate may be formalized after any of the methods depicted in Examples 2A to 2E inclusive.

*Example 1E.*—This example is in all respects identical with Example 1A except that in lieu of 60 pounds of urea there is used a mixture comprising 48 pounds of urea and 22 pounds of thioammeline. After concentration the modified resinous condensate may be formalized after the manner depicted in Examples 2A to 2E inclusive.

The effect of the inclusion of an appropriate "modifying agent" for the production of the formalization products of the present invention is to modify the physical and chemical properties of the ultimate formalization product. Thus, by way of example, some of the afore-described modified products of the illustrative examples are resistant to the action of boiling water when cured to the "C" stage in distinction to the unmodified products which, while resistant to cold water, are not resistant to boiling water. On the other hand, some modifying agents, such as guanyl guanidine, have the effect of diminishing the water resistance of the ultimate cured product. The inclusion of an appropriate "modifying agent" is often desirable from the standpoint of producing emulsions, for it is well known that in the absence of a modifying agent it is not a simple matter to secure the conversion of the major portion of the resin into a colloidal form. Modifying agents are also of value in the modification of the solubility and compatibility relationships of the hemi-formalized products. The speed of cure is also often very appreciable affected by the nature of the modifying agent used. Water tolerances are often markedly affected by the inclusion of a modifying agent.

The unexpected, new and distinctive physical and chemical attributes possessed by the products of the present invention have their origin in the fact that a reaction has occurred between the concentrated urea-formaldehyde resinous condensate and the formaldehyde of formalization. We present below data and proofs which, when considered individually and collectively, clearly support our contention that such a reaction occurs and that the products of our invention are in the nature of a new species of reaction product.

*Data 3A.*—When gaseous formaldehyde is added to a highly concentrated solution of urea-formaldehyde resinous condensate, e. g., as per Example 1A, between 13 and 15 kilocalories of heat are evolved for every mole of formaldehyde added. The quantity of heat so evolved is substantially equal to the quantity of heat that is evolved when gaseous formaldehyde is mixed with polar solvents with which it is definitely known that formaldehyde enters into reaction. These thermal effects may be accepted as indicating that a reaction has occurred between the formaldehyde and the concentrated urea-formaldehyde resinous condensate (the quantity of water present in the concentrated urea-formaldehyde resinous condensate is insufficient to account for the quantity of heated evolved and, furthermore, it can be shown that virtually all of that water is in more or less a state of combination with the concentrated urea-formaldehyde resinous condensate).

*Data 3B.*—Raman and absorption spectrums indicate that the characteristic frequencies associated with the CO bond of the HCHO disappear when the formaldehyde is taken up by a concentrated solution of urea-formaldehyde resinous condensate, thus paralleling the behavior of formaldehyde with water and alcohols, which polar solvents are known to react with HCHO to form methylene glycol and hemiacetals respectively.

*Data 3C.*—Formaldehyde taken up by a concentrated urea-formaldehyde resinous condensate is released only with difficulty even at temperatures in excess of 100° C. notwithstanding the fact that formaldehyde at ordinary temperatures is a gas. This behavior simulates the well known difficulty of removing formaldehyde from aqueous solutions owing to the combinations of the formaldehyde with the water.

*Data 3D.*—A study of the partial pressure of formaldehyde over masses of concentrated urea-formaldehyde resinous condensate discloses that the pressure is immeasurably lower than what one would anticipate if no reaction occurred. This parallels the behavior of formaldehyde when dissolved in polar solvents, with which it is known to enter into combination.

*Data 3E.*—A study of molecular weight data of a solution comprising highly concentrated urea-formaldehyde resinous condensate and substantially one mole of formaldehyde (in gaseous form) discloses a distinct shifting of the molecular weight distribution curve in the direction of higher molecular weights as would be the case if the formaldehyde entered into reaction with the resinous condensate.

*Data 3F.*—Preparations produced by adding gaseous formaldehyde to concentrated urea-formaldehyde resinous condensate show a negative deviation from Raoult's law, a criteria which may be looked upon as indicating that some extraordinary reaction has occurred.

*Data 3G.*—Mixtures of concentrated urea-formaldehyde resinous condensate with gaseous formaldehyde show a marked deviation from Henry's law which may be accepted as indicated that some sort of reaction has occurred between the formaldehyde gas and the urea-formaldehyde condensate.

*Data 3H.*—A study of the kinetics of the change and transposition in solution equilibrium furnishes additional proof that reaction has occurred between the urea-formaldehyde resinous condensate and the gaseous formaldehyde. When water is added to formalization products, such as those of Examples 2B, it is found that only a small quantity of heat is evolved corresponding to that anticipated for the heat of solution.

*Data 3I.*—It is an established fact that concentrated urea-formaldehyde resinous condensates are possessed of but a limited life or short keeping qualities. Aqueous solutions of urea-formaldehyde resinous condensate with solid contents of between 50 and 75%, even when buffered to the point of maximum shelf life, have a life at ordinary temperatures that ranges between 2 and 8 months. More concentrated solutions (e. g. 85% solids) have an even shorter shelf life, sometimes in the order of but a few weeks at ordinary temperatures. At elevated temperature (e. g. 100° F.) the shelf life of such urea-formaldehyde resinous condensates is usually cut in half, as compared to the life at ordinary room temperature. We have made the unexpected discovery that the products of the present invention are possessed of a very much greater shelf life. Thus, the formalization products of Examples 2A and 2B have shelf lives at ordinary temperatures of in the neighborhood of two years and even at 100° F. the shelf life is approximately one year. The effects of the presence of the formaldehyde of formalization is to increase the shelf life 4 to 5 fold over that of the unformalized products. This increased stability is a factor of the utmost importance from the standpoint of commercial utility in that it permits the shipment and the use of the products of the present invention in hot tropical climates (ordinary urea-formaldehyde resinous condensates are often worthless by the time they arrive in tropical regions due to reaction occurring during the time of shipment).

*Data 3J.*—It is a well recognized fact that when urea-formaldehyde resinous condensates of the usual composition are stored for any great length of time they become converted over into the fully cured "C" stage where they are wholly insoluble and infusible. We have made the unusual discovery that when our products pass into the gelled state, they, upon heating, liquefy and remain fluid, without the slightest tendency towards conversion over into the final "C" stage. This remarkable behavior is attributed to the fact that the products of the present invention are hemi-formalization products and that in the process of reaction at ordinary temperatures (more rapidly in the presence of acidic media or at elevated temperatures) they are converted into true acetals.

*Data 3K.*—When strongly acidic materials are added to the usual type of concentrated urea-formaldehyde resinous condensate, so as to depress the pH to below 4.0, a rapid reaction of condensation and polymerization sets in, resulting in the conversion of the resinous condensate from the fusible soluble state to the infusible insoluble thermo-rigid or "C" stage. This well known phenomenon is extensively utilized in the arts, e. g., in the manufacture of plastic articles and resinous bodies the more or less soluble and fusible urea-formaldehyde resinous condensates are converted into the cured thermo-rigid state via treatment with appropriate acidic materials which function in the role of catalyst. We have made the wholly unexpected discovery that when strongly acidic bodies are added to the hemiformalization products of our invention so as to depress the pH to below 4.0 or, for that matter, when one adds a hundred times as much acid as is necessary to so depress the pH, the products do not set up to the expected infusible, insoluble, thermo-rigid, cured "C" stage and, on the contrary, become transformed into a new and useful class of heretofore unknown resinous products. The new products thus engendered appear to be in the nature of normal acetals as distinct from the hemi-acetals of the present invention. The ability of the hemi-formalization products of the present invention to withstand a highly acidic environment without setting up to the cured state can be capitalized upon for the carrying out of a whole series of chemical reactions which one was heretofore precluded from carrying out. These aspects are more specifically dealt with in a subsequent portion of these specifications.

*Data 3L.*—The refractive indexes of the hemiformalization products of the present invention are higher than what one would anticipate for a system which involves but simple solution without reaction.

*Data 3M.*—The specific viscosities of the hemiformalization products of the present invention are higher than what would be the case in the instance of mixtures involving but simple solution.

*Data 3N.*—The specific gravities of the hemiformalization products of the present invention are higher than what one would expect in the instance of mixtures involving but simple solution.

*Data 3O.*—It is a well known fact that it is not possible to determine the formaldehyde content of solutions of urea-formaldehyde resinous condensates with any great degree of accuracy. We have found that the formaldehyde content as determined by various methods of analyses is subject to wide variation, being dependent upon the temperature, time, concentration, etc. It was observed, however, that when using the eight most reliable methods for the determination of free formaldehyde, it was found that in each instance the quantity of formaldehyde as determined by analysis appeared to be somewhat less than the quantity of formaldehyde of formalization known to have been added. Attention is directed to the fact that in the instance of hemiacetal formation there is involved a reaction of the nature of a reversible equilibrium. As a consequence when there is added to such a mixture a reagent which can fix formaldehyde in an irreversible manner, the same reagent will, under appropriate conditions, fix unto itself all of the formaldehyde that exists either originally as free formaldehyde or as formaldehyde combined in the dissociable reversible reaction. One would therefore normally expect that analysis would indicate a quantity of formaldehyde equal to the quantity of formaldehyde of formalization. The fact that this is not the case indicates that in a small measure a reaction has taken place wherein formaldehyde is fixed in a non-reversible reaction, e. g. true acetal formation.

*Data 3P.*—Further indication of compound formation between concentrated urea-formaldehyde resin of condensation and formaldehyde of formalization is furnished by a study of the solubility and compatibility of the product of the present invention with a wide variety of products. It has been found that the compositions of the present invention are possessed of a greater solubility and a greater compatibility with a wide variety of unrelated products with which the usual straight urea-formaldehyde resinous condensates are either entirely insoluble or but very slightly compatible. These aspects are dealt with in greater detail in a subsequent portion of these specifications.

We have presented an array of data covering experimental findings which appears to us to clearly indicate that formaldehyde enters into reaction with concentrated urea-formaldehyde resinous condensates. The reactions involved appear to be of a reversible nature. The various components of the system are in equilibrium with one another. When the system is disturbed, as through the removal or addition of one of the components, the equilibrium is correspondingly shifted in one direction or the other. The reversible nature of the reaction involved constitutes a very strong indication that the reaction is one involving hemi-acetal formation. The ability of formaldehyde to enter into hemi-acetal formation with polar solvents is very well recognized. It is to be observed that the reaction between formaldehyde and concentrated urea-formaldehyde resinous condensate in every respect parallels the reactions that are known to occur between formaldehyde and polar solvents with which it enters into reaction to form hemi-formalization products.

Incidental to the present invention we have discovered that it is possible to further react the hemi-formalization products so that a substantial proportion of the formaldehyde becomes fixed in an irreversible manner by what is probably a true acetal linkage as distinct from the hemi-acetal linkage. Hemi-acetal formation involves an aldehyde molecule and a reactive hydrogen atom, usually attached either to an oxygen atom (e. g. (—OH)) or a nitrogen atom (e. g. (—NH$_2$), (—NH—)).

The hemi-formalization products of the present invention are possessed of many new and distinctive properties. In some applications it is possible to substitute the hemi-formalization products of the present invention for the usual type of urea-formaldehyde resinous condensate. In general, however, it is not possible to make a direct substitution owing to the fact that the presence of the formaldehyde of formalization usually prevents these products from paralleling the reaction manifested by the usual types of urea-formaldehyde resinous condensate. However, through the addition of appropriate coagents, an aspect which will be dealt with in greater detail further on, it is possible to utilize the hemi-formalization products to advantage.

The unique physical and chemical properties of the hemi-formalization products of the present invention permits their use in many applications and for many reactions for which the usual types of urea-formaldehyde resinous condensates are wholly unsuited.

In the ensuing paragraphs we present some of the novel properties of the formalization products of the present invention.

Upon treatment with appropriate quantities of strong acid it is possible to convert the formalization products of the present invention over into what appear to be true acetals of urea-formaldehyde resinous condensates. Such reaction products wherein formaldehyde is irreversibly reacted with a urea-formaldehyde resinous condensate have heretofore been unknown.

A variety of unique products can be produced out of the hemi-formalization products through treatment with appropriate quantities of strongly acidic materials. Thus, when small quantities of strong acids are added to the compositions of the present invention, at room temperature, the mixtures undergo a rapid increase in viscosity and soon set, first to a soft gel and then to a very firm transparent gel. Upon further standing, however, the gel begins to soften and ultimately is completely ungelled, resulting in the formation of a smooth flowing liquid. The liquification of the gel can be hastened through the application of heat. If, on the other hand, the reaction is carried out at elevated temperatures from the start, then the gelation phase does not manifest itself as a distinct entity and the mass passes from the original liquid phase directly into the new liquid phase. The difference in constitution between the original product and the product after treatment appears to reside in the fact that the former is a hemi-formalization product, whereas the latter is a true acetal, in whose formation a large portion of the formaldehyde has become irreversibly tied up. Furthermore, whereas the hemi-formalization products are generally infinitely water-soluble the products that result after the afore-described acid treatment are possessed of but a limited tolerance for water and in many instances cannot tolerate any more water than what they contain.

One of the most practical and unique features associated with the hemi-formalization products of the present invention resides in their exceedingly long shelf life. This feature permits their use at elevated temperatures and in tropical climates. Furthermore it permits users to maintain sizeable inventories of this product without fear of its deteriorating. With but few exceptions it is not feasible to utilize the hemi-formalization products "per se" owing to the fact that the formaldehyde of formalization prevents or precludes one from curing these products in the conventional manner. We have circumvented this difficulty by producing appropriate coagents, (which of themselves are possessed of a virtually unlimited life), which the user adds to the hemi-formalization products prior to use. Through the addition of appropriate coagents the hemi-formalization products lend themselves for use as impregnants, adhesives, surface coatings, inks, dyeing aids, bonding materials, materials for the sizing of paper and textiles, as well as for the manufacture of molding compounds, etc. These aspects will be described in greater detail in a subsequent portion of these specifications.

The peculiar properties that permit the hemi-formalization products of the present invention to function in conjunction with a coagent appear to reside in the fact that the formaldehyde of formalization being in combination with the urea-formaldehyde resinous condensate is able to combine with the coagent in a manner such that the newly engendered reaction product becomes an integral part of the already formed urea-formaldehyde resinous condensate, so that the resultant entity functions very much after the manner of a straight urea-formaldehyde resinous condensate. That some such reaction must occur can readily be seen from the fact that, as a general rule, one cannot employ mere mixtures of urea and formaldehyde for applications in which urea-formaldehyde resinous condensates are employed.

Another material advantage that arises out of the ability of the products of the present invention to work in conjunction with appropriate coagents, resides in the fact that, upon a weight basis, the total weight of coagent plus hemi-formalization product is substantially on a parity with that of the completely dehydrated urea-formaldehyde resinous condensate in dry form. The hemi-formalization products are in a conveniently pourable form, a circumstance which, however, does not necessitate the shipment of unnecessary weight, as in the instance of the usual urea-formaldehyde resinous condensates in liquid form.

A further advantage possessed by the products of the present invention arises out of the fact that the coagent, which is simply a physical mixture, contains approximately one-third of the total urea (or equivalent) utilized. In the past, when preparing a given quantity of urea-formaldehyde resinous composition it has been necessary to condense the whole of the urea with the formaldehyde so as to yield a resinous condensate. In the instance of the present invention, however, it will be seen that inasmuch as the coagent is in an unprocessed form it means that only two-thirds of the ultimate composition has to be processed to the point of resinous condensation products. This simplification entails a 33% reduction in plant equipment for the production of one and the same quantity of ultimate product.

A peculiar attribute of the hemi-formalization products of the present invention resides in the fact that when they are diluted into a large volume of water and there is then added a quantity of urea in the proportion of one mole for every two moles of formaldehyde of formalization and there is further added a small quantity of a strong mineral acid, virtually the whole of the urea, formaldehyde, and urea-formaldehyde resinous condensate is thrown out of solution in the form of a snow-white, micro-fine powder which is in an exceedingly fine state of division and is completely non-tacky. The powder may readily be separated from the mother liquor by decantation, filtration or centrifugation. The dry powder is extremely useful as a filler, pigment, or absorbent. It also lends itself to chemical synthesis, e. g., it may be dissolved in concentrated hydrochloric acid and upon subsequent vacuum concentration the solution may be made to yield a solid resinous product which is moldable and may be used for a variety of purposes.

One of the most striking and unusual attributes of the products of the present invention resides in their ability to tolerate virtually unlimited quantities of strong mineral acids. This ability to tolerate strongly acidic environments may be capitalized upon in a variety of ways. This unique feature permits reacting the products of the present invention with a host of other materials with which the ordinary urea-formaldehyde resinous condensates could not possibly be reacted owing to the fact that in the requisite acidic environment such products would be converted over to the infusible, insoluble "C" stage.

The hemi-formalization products, when prepared along the lines of Examples 2A to 2E, are infinitely soluble in water. One of the peculiarities of these products resides in the fact that they remain infinitely water-soluble for extremely long periods of time. Although products of limited water solubility can be prepared along the lines already previously described, it is also possible to prepare products of limited water solubility by making use of the fact that upon acidulation and heat treatment these products undergo further reaction, leading to the formation of normal acetals which are possessed of but a limited water tolerance, owing to the disappearance of hydrophilic functional groups which appear to enter into the reaction mechanism centering around the acetal formation.

Another feature which is characteristic of many of the hemi-formalization products of the present invention is the ability of these products to tolerate substantial quantities of a wide variety of organic compounds which are normally incompatible with the usual types of urea-formaldehyde resinous condensates. The formaldehyde of formalization also exerts a solvent effect which is often sufficiently great to enable it to function as a coupling agent between the hemi-formalization product and other materials with which it would normally be but slightly compatible. As a general rule, when it is desired to utilize hemi-formalized urea-formaldehyde resinous condensates in conjunction with organic materials that are possessed of but a slight solubility in water, it is recommended to employ hemi-formalization products which contain but a small quantity of water, e. g., those prepared after the manner of Example No. 2C. In a subsequent portion of these specifications we present a number of illustrative mixtures along these lines.

In the foregoing portions of these specifications we have presented an array of data intended to show that the products of the present invention are reaction products and are not merely physical mixtures of unreacted materials. We have also indicated methods for the production of the formalization products of the present invention. Further, we have described many of the characteristics and unique properties of these products. We now present an array of highly diversified practical uses to which the products of the present invention are preeminently suited.

*Example 4A.*—The hemi-formalization products have been found suitable for use in the impregnation of cellulosic and protein materials.

*Example 4B.*—The hemi-formalization products have been found highly satisfactory as adjuncts and modifying agents in the production of starch adhesives. Such modified adhesives are particularly valuable in the manufacture of wood laminates and in the manufacture of paper products such as cardboard, corrugated pasteboard, paper boxes, V-board, etc. where they impart increased strength and resistance toward water.

*Example 4C.*—The hemi-formalization products of the present invention have shown themselves well adapted for the sizing of textiles. The presence of the formaldehyde of formalization appears to be helpful in that it tends to render the product less subject to wrinkling, etc. Furthermore, these products, owing to their inherent stability and owing to the fact that they do not form excessively high molecular weight complexes in storage are possessed of better penetrating qualities.

*Example 4D.*—When used in conjunction with appropriate coagents (which latter comprise curing catalysts, agents for reaction with the formaldehyde of formalization, and may also include materials for the modification of color, wetting qualities, viscosity, etc.) the hemi-formalization products are ideally suited as impregnants for a large variety of porous or absorbent materials, including cellulosic compositions, protein compositions, plaster of Paris, mineral wool products, etc. Potentially reactive compositions comprising the hemi-formalization products and appropriate coagents are admirably adapted for use as adhesives, textile sizing agents, for the manufacture of molding compounds, etc.

*Example 4E.*—A white, micro-fine powder of many uses can be prepared by adding one mole of urea for every two moles of formaldehyde of formalization contained in the hemi-formalization product, diluting with a large quantity of water and then strongly acidulating, as via the addition of sulfuric or hydrochloric acids. After a few minutes of mixing, substantially the whole of solids are precipitated in the form of a snow-white powder which can readily be isolated via decantation, filtration and centrifugation. The material may be dried in an oven. The product is possessed of a low specific gravity and is substantially non-flammable and inert toward ordinary weathering and solvents. It is useful as a filler, a pigment and absorbent. It may also be utilized for further syntheses, as by reaction with concentrated hydrochloric acid.

*Example 4F.*—Upon the addition of substantial quantities of strong acid to the hemi-formalization products, preferably with the aid of heat, the products become converted into a new and distinctive entity, wherein a large portion of the formaldehyde of formalization becomes irreversibly tied up with the urea-formaldehyde resinous complex. These compositions are hereinafter referred to as "hyper-formalization" products, to distinguish them from the hemi-formalization products of the present invention. In the hemi-formalization products the formaldehyde is tied up in a state of loose association, wherein it is in equilibrium with the various components entering into the system, whereas in the instance of the hyper-formalization products a considerable portion of this formaldehyde becomes irreversibly tied up, apparently by way of a true acetal linkage. The hyper-formalization products differ from the hemi-formalization products in many ways. A hemi-formalization product which is infinitely water-soluble becomes, upon hyper-formalization, possessed of but a low tolerance for water and indeed may be incapable of tolerating more water than what it already contains. Although the hyper-formalization products of concentrated urea-formaldehyde resinous condensates are not specifically claimed in the present application, we wish it to be understood that the hemi-formalization products of the present invention are essential intermediaries for the production of the aforesaid hyper-formalization products.

The production, attributes, and utility of the hyper-formalization products derived from the hemi-formalization products of the present invention are fully described in copending application Serial No. 622,482, filed October 15, 1945.

*Example 5BA.*—To 162 parts of the product of Example 2C there are added 90 parts of glycerine. A water-clear, viscous, solution results.

*Example 5BB.*—To 162 parts of the product of Example 2C there are added 80 parts of tetraethylene glycol, resulting in the prodction of a viscous water-clear solution.

*Example 5BC.*—To 162 parts of the product of Example 2C there are added 40 parts of 1-chloro-1-nitro-propane. A straw-colored, clear solution results.

*Example 5BD.*—To 162 parts of the product of Example 2C there are added 70 parts of 1-chloro-nitro-ethane. A viscous, clear, straw-colored solution results.

*Example 5BE.*—To 162 parts of the product of Example 2C there are added 60 parts of ethyl lactate. A viscous, water-clear, solution results.

*Example 5BF.*—To 160 parts of the product of Example 2C there are added 80 parts of ortho-cresol to produce a viscous, clear, solution.

*Example 5BG.*—To 162 parts of the product of Example 2C there are added 100 parts of furfurglycerol, to produce a clear, light amber colored, viscous solution.

*Example 5BH.*—To 218 parts of the product of Example 2A there are added 40 parts of allyl alcohol to produce a water-clear solution.

*Example 5BJ.*—To 218 parts of the product of Example 2A there are added 40 parts of morpholine to yield a water-clear solution.

*Example 5BK.*—To 162 parts of the product of Example 2C there are added 80 parts of the monomethyl ether of ethylene glycol to yield a water-clear solution.

*Example 5BL.*—To 162 parts of the product of Example 2C there are added 100 parts of a solution comprising 31 parts of glyoxal dissolved in 69 parts of water to yield a light straw-colored, clear solution.

The mixtures depicted above are all in the form of clear solutions, that is, they are optically homogeneous. The majority of these preparations are possessed of excellent keeping qualities, e. g., in the order of a year and a half to two years at ordinary room temperatures. Mixtures such as the above, particularly those with a low water content, are frequently compatible with numerous materials with which the straight hemi-formalized urea-formaldehyde resinous condensates are not normally compatible.

Preparations of technical interest can be prepared by admixing hyper-formalized urea-formaldehyde resinous condensates with water-soluble resinous substances, such as polyhydroxy-vinylacetate dissolved in aqueous methanol, or products such as sodium carboxymethyl cellulose. In this manner it is possible to regulate and control such properties as the viscosity, flow characteristics and brushability. Of particular interest in this connection are the products produced by reacting hyper-formalized urea-formaldehyde resinous condensates with unsaturated materials such as vinyl acetate, allyl alcohol, acrylonitrile, etc. or a combination of such materials. Such compositions may be utilized in the preparation of surface coatings. The addition of catalysts, such as cobalt naphthenate, is advantageous, as these materials expedite the polymerization of the polymerizable groups. For the best results the coating should be given a moderate bake, as this tends to thermoset the urea resin complex while the oxygen tends to link the various double bonds that are present. The hemi-formalized, as well as the hyper-formalized, urea-formaldehyde resinous condensates (particularly their reaction products with other materials, as illustrated in the foregoing examples) are of interest for use in conjunction with other resinous products with which they are compatible, e. g., phenol-formaldehyde resins, ketone-aldehyde resins, etc.

The products of the present invention are useful for thermosetting or cross linking materials such as polyvinyl butyral, protein products, etc. When used for these applications it is only necessary to add between 5 and 25% of the hemi- or hyper-formalized materials on the weight of the material to be set. Upon subjecting the mixture to an appropriate heat treatment the same is thermoset or cured. In the instance of polyvinyl butyrals it is frequently desirable to use an appropriately modified type because the modification enables one to endow the product with a greater compatibility toward polyvinyl butyral.

The hemi-formalized urea-formaldehyde resinous condensates, as well as their numerous modifications, may be used in conjunction with standard aminoplast resins, such as the common urea-formaldehyde resins, melamine resins, formo-guanamine resins, thiourea-formaldehyde resins, etc.

The compositions of the hemi-formalization products of the present invention, as well as those of the concentrated urea-formaldehyde resinous condensates that go into their preparation, are conveniently defined in terms of their progenitors, viz., urea, formaldehyde and water, provided, of course, that cognizance is taken of the fact that these products normally contain no free urea, monomethylol urea or dimethylol urea and that the whole of the urea is in the form of a resinous condensation product. The composition may then be expressed either in terms of weight or in terms of molar proportions. The following data, based upon the aforemethod of defining the composition in terms of the progenitors, is typical:

*Product of Example 2A.*—Expressed upon a weight basis we have: urea, 60 parts; formaldehyde (HCHO), 90 parts; water 63 parts. Expressed upon a molar basis we have: urea, 1 mole; formaldehyde (HCHO), 3 moles; water 3.5 moles.

*Product of Example 2C.*—Expressed upon a weight basis we have: urea, 60 parts; formaldehyde (HCHO), 90 parts; water, 12 parts. Expressed upon a molar basis we have: urea, 1 mole; formaldehyde (HCHO), 3 moles; water, 0.667 mole.

Using the above method of defining the composition, it will be noted that if the condensate of Example 1A had been concentrated to a weight of 120 parts (corresponding to twice the weight of urea utilized) and the product hemi-formalized via the use of gaseous formaldehyde or paraformaldehyde, the water concentration would appear to be zero. Actually such a composition would contain a certain small amount of water, substantially all of which would be held in a state of more or less loose association by the urea-formaldehyde resinous condensate and the formaldehyde.

It will be noted that if the condensate of Example 1A be concentrated to 2½ times the weight of urea utilized, there would be present 30 parts of water per 60 parts of urea. If this product in turn were hemi-formalized via the addition of 1 mole of formaldehyde in the form of a 25% aqueous solution, the final composition will contain 6.667 moles of water per mole of urea. If the composition be hemi-formalized by the addition of 1.5 moles of formaldehyde of 25% concentration the water content would become 9.17 moles of water per mole of urea. Such a large water concentration depresses the degree of formalization.

We have found that the water concentrations that are of the greatest practical utility range from about 0.5 to 5.0 moles of water per mole of urea. In applications where the minimum quantity of water is desired, the preferred range is between 0.5 and 1 mole of water per mole of urea. Where a product of good pourable viscosity is desired, and this includes most practical applications, it is found that between 3 and 4 moles of water per mole of urea constitutes the optimum range.

It is interesting to note that when the above described method of defining the compositions is used, all formaldehyde that is present over and above about 2 moles of formaldehyde per mole of urea may be looked upon as formaldehyde of formalization.

The compositions of the hemi-formalization products of the present invention, as well as those of the concentrated urea-formaldehyde resinous condensates that go into their preparation, instead of being defined in terms of their progenitors, may also be conveniently defined in terms of their nitrogen and carbon contents, provided, of course, that cognizance is taken of the fact that the nitrogen content has its origin in the urea, all of which latter is assumed to be tied up in the form of a urea-formaldehyde resinous condensate. In this system of calculation it is to be noted that there is one atom of carbon for every two atoms of nitrogen contained in the urea and all carbon over and above the carbon thus ear-marked for the urea constitutes carbon that has its origin in the formaldehyde. The nitrogen and carbon contents can readily be computed from the weight or molar proportions of the progenitors.

It is thought to be clear from the foregoing disclosures that the reversible reaction products of the present invention, conveniently referred to as "hemi-formalization products of concentrated urea-formaldehyde resinous condensates," constitute a unique and novel group of materials having an exceedingly wide range of useful industrial application. Compositions containing the products of the present invention are useful in the manufacture or preparation of such varied products as the following—for convenience listed alphabetically:

Adhesives; casting compositions, cements; chemical intermediaries; cross-linking agents; dyeing aids; enamels; extenders for resins, plastics and rubbers; fillers for resins, rubbers, etc.; floor coverings; frictional elements; glues; impregnating agents; inks; insulating compositions; insecticides; leather substitutes; lacquers; molding compositions; paints; plastics; plywood; proofing agents; stiffening agents; textile sizing agents; varnishes, etc.

In the foregoing paragraphs we have described our invention in a broad manner and have presented generalized as well as specific and detailed directions for the production of the products of the invention. We have also presented data relative to the matter of equivalents as well as the various modifications that are possible. This has been followed by the presentation of an array of data intended as evidence of the "hemi-formalization" which is an essential part of our invention. There are then described the unique and distinctive properties of the hemi-formalized urea-formaldehyde resinous condensates, as well as an array of examples depicting their practical utility.

The invention has been described in connection with a number of illustrative embodiments, materials, proportions, conditions and arrangements of operations for the carrying out of the same. The invention is not to be regarded as restricted to the foregoing specifically detailed disclosures, but should be regarded as encompassing the broad and general disclosures. Nor should any limitations be imported which are not required by the language of the appended claims and the state of the prior art. The invention should not be considered as dependent upon any explanation or theory which has been set forth as descriptive of the action involved, nor upon the accuracy or soundness of any theoretical statements so advanced. It is obvious that many modifications and variations in the manipulative technique and in the components may be made without departing from the spirit and scope of the invention as encompassed by the conditions and concentration ranges disclosed in these specifications and as defined in the appended claims.

We claim.

1. The method of producing soluble and fusible hemi-formalization products of urea-formaldehyde resinous condensates, which comprises the steps of reacting a mole of urea with between about 1.75 and 2.5 moles of formaldehyde in the presence of water to the soluble and fusible resinified state, said resinification being carried out in an acid environment to assure the substantially complete resinification of the urea, then substantially neutralizing the excess acidity and concentrating the resinified product to a net weight of between about 2.0 and 2.5 times the weight of the urea consumed, and then adding between 0.50 and 1.5 moles of formaldehyde per mole of the aforesaid urea, in a form assaying not less than 25% of formaldehyde.

2. The method of claim 1, the formaldehyde added in the last mentioned step being aqueous formaldehyde.

3. The method of claim 1, the formaldehyde added in the last mentioned step being gaseous formaldehyde.

4. The method of claim 1, the formaldehyde added in the last mentioned step being in the form of paraformaldehyde.

5. Soluble and fusible hemi-formalization products of urea-formaldehyde resinous condensates made in accordance with the method defined in claim 1.

EMIL E. NOVOTNY.
GEORGE KARL VOGELSANG.
ERNEST E. NOVOTNY.

REFERENCES CITED

The following references are of record in the file of this patent:

UNITED STATES PATENTS

| Number | Name | Date |
|---|---|---|
| 2,093,364 | Pollak | Sept. 14, 1937 |

FOREIGN PATENTS

| Number | Country | Date |
|---|---|---|
| 438,887 | Great Britain | Nov. 18, 1935 |
| 792,562 | France | Oct. 21, 1935 |